United States Patent
Blacklock et al.

(10) Patent No.: US 7,772,306 B2
(45) Date of Patent: Aug. 10, 2010

(54) CYANOACRYLATE COMPOSITIONS HAVING INCREASED STABILITY UNDER IRRADIATION

(75) Inventors: Donald S. Blacklock, Delta (CA); Thomas J. Berger, New Athens, IL (US)

(73) Assignee: Glustitch, Inc., Delta, British Columbia (BC) (CA)

( * ) Notice: Subject to any disclaimer, the term of this patent is extended or adjusted under 35 U.S.C. 154(b) by 863 days.

(21) Appl. No.: 11/489,277

(22) Filed: Jul. 18, 2006

(65) Prior Publication Data

US 2008/0021139 A1 Jan. 24, 2008

(51) Int. Cl.
*C08K 5/12* (2006.01)
*C08K 5/10* (2006.01)
*C08K 5/09* (2006.01)

(52) U.S. Cl. .............. 524/295; 524/296; 524/310; 524/315; 524/317; 524/555; 524/773; 524/776; 526/298

(58) Field of Classification Search .......... 524/295, 524/296, 310, 315, 317, 555, 773, 776; 526/298
See application file for complete search history.

(56) References Cited

U.S. PATENT DOCUMENTS

| | | | |
|---|---|---|---|
| 2,784,127 A | 3/1957 | Joyner et al. | |
| 3,527,224 A | 9/1970 | Rabinowitz | |
| 3,591,676 A | 7/1971 | Hawkins et al. | |
| 3,654,239 A | 4/1972 | McIntire et al. | |
| 3,667,472 A | 6/1972 | Halpern | |
| 3,667,477 A | 6/1972 | Susset et al. | |
| 3,995,641 A | 12/1976 | Kronenthal et al. | |
| 4,035,334 A | 7/1977 | Davydov et al. | |
| 4,038,345 A | 7/1977 | O'Sullivan et al. | |
| 4,405,750 A * | 9/1983 | Nakata et al. | 524/717 |
| 4,444,933 A | 4/1984 | Columbus et al. | |
| 4,650,826 A | 3/1987 | Waniczek et al. | |
| 5,254,132 A | 10/1993 | Barley et al. | |
| 5,480,935 A | 1/1996 | Greff et al. | |
| 5,530,037 A | 6/1996 | McDonnell et al. | |
| 5,928,611 A | 7/1999 | Leung | |
| 5,998,472 A | 12/1999 | Berger et al. | |
| 6,099,807 A | 8/2000 | Leung | |
| 6,143,805 A | 11/2000 | Hickey et al. | |
| 6,191,202 B1 | 2/2001 | Greff et al. | |
| 6,248,800 B1 | 6/2001 | Greff et al. | |
| 6,274,127 B1 * | 8/2001 | Schraer et al. | 424/65 |
| 6,322,852 B1 | 11/2001 | Leung | |
| 6,328,910 B1 | 12/2001 | Askill et al. | |
| 6,512,023 B1 | 1/2003 | Malofsky et al. | |
| 6,538,026 B1 * | 3/2003 | Krall et al. | 514/527 |
| 6,547,467 B2 | 4/2003 | Quintero | |
| 6,582,713 B2 | 6/2003 | Newell et al. | |
| 6,616,019 B2 | 9/2003 | D'Alessio et al. | |
| 6,620,840 B1 | 9/2003 | Bigg et al. | |
| 6,705,790 B2 | 3/2004 | Quintero et al. | |
| 2003/0044219 A1 | 3/2003 | Quintero | |
| 2007/0248486 A1 * | 10/2007 | Morales | 422/22 |

FOREIGN PATENT DOCUMENTS

| | | |
|---|---|---|
| CA | 2221260 A1 | 12/1996 |
| CN | 2342342 A1 | 3/2000 |

* cited by examiner

*Primary Examiner*—Bernard Lipman
(74) *Attorney, Agent, or Firm*—Joshua King; Graybeal Jackson LLP

(57) ABSTRACT

A series of mixtures of N-butyl cyanoacrylate and 2-octyl-cyanoacrylate monomers having specific and differing concentrations of free radical inhibitor/antioxidant stabilizers for each mixture of the two monomers. This results in cyanoacrylate compositions that can withstand radiation such as E-beam and gamma radiation at any desired level and not be adversely affected.

21 Claims, No Drawings

CYANOACRYLATE COMPOSITIONS HAVING INCREASED STABILITY UNDER IRRADIATION

BACKGROUND

The teachings of all of the references cited herein are hereby incorporated herein by reference.

Cyanoacrylate (CA) ester adhesive compositions have many uses in the medical, dental and veterinary fields. The cyanoacrylate adhesives have been used as replacements for sutures or staples in closing the dermal (skin) layer of wounds or of incisions, liquid bandages and dental cements. In Vietnam a cyanoacrylate adhesive was sprayed over wounds, especially chest and abdominal wounds, to stop bleeding until more conventional surgery could be performed. Such cyanoacrylate compositions must be sterile prior to application to a wound. U.S. Pat. No. 6,248,800 discloses the sterilization of cyanoacrylate adhesives using E-beam radiation. However, the exposure of cyanoacrylate esters to E-beam radiation can result in a partial polymerization of the monomers thus affecting both the shelf life and the performance of the cyanoacrylates. Thus, there is a need for more stable cyanoacrylate formulations that are resistant to polymerization by E-beam radiation.

SUMMARY

The methods, compositions, etc., discussed herein fill this and/or other needs by providing novel cyanoacrylate formulations comprised of a mixture of a n-butyl-cyanoacrylate (NBCA) monomer and a 2-octyl-cyanoacrylate (2-OCA) monomer at varying percent concentrations of each and varying amounts of stabilizers that are advantageous for the specific blend of n-butyl-cyanoacrylate. Examples of cyanoacrylate compositions of the present invention include the following compositions: 90% NBCA, and 10% 2-OCA that has about 630-880 ppm of a free radical inhibitor/anti-oxidant stabilizer; a composition having 80% NBCA and 20% 2-OCA, which has about 549-799 ppm of a free radical inhibitor/anti-oxidant stabilizer; a composition having 70% NBCA and 30% 2-OCA, which has about 486-736 ppm of the free radical inhibitor/anti-oxidant stabilizer; a composition comprised of 60% NBCA and 40% 2-OCA which has about 423-673 ppm of the free radical inhibitor/anti-oxidant stabilizer; a composition comprised of 40% NBCA and 60% 2-OCA, which has about 297-547 ppm of the free radical inhibitor/anti-oxidant stabilizer; and a composition comprised of 30% NBCA, 70% 2-OCA and which has about 234-584 ppm of the free radical inhibitor/anti-oxidant stabilizer. Free radical inhibitor/anti-oxidant stabilizers include hydroquinone, hydroquinonemonomethylether, catechol, pyrogallol, benzoquinone, 2-hydroxybenzoquinone, p-methoxy phenol, 1-butyl catechol, butylated hydroxytoluene, t-butyl hydroquinone, butylated hydroxyanisole (BHA) methyl hydroquinone, catechol, tert-butyl hydroquinone, 4-tert-butoxyphenol, 4-ethoxyphenol, 3-methoxyphenol, 2-tert-butyl-4-methoxyphenol, and 2,2-methylene-bis-(4-methyl-6-tert-butylphenol). BHA is a preferred free radical inhibitor. Another preferred antioxidant is butyl hydroxy toluene (BHT, or 4-methyl-2,6-di-tert-butylphenol), which is also a well-known antioxidant for food.

Preferred formulations showing the amount of stabilizer that is added to the formulation are shown in the table below.

| Amt. of NBCA (%) | Amt. of 2-OCA (%) | Amt. of Free-radical Inhibitor/Anti-oxidant stabilizer (ppm) |
| --- | --- | --- |
| 90 | 10 | 630 |
| 80 | 20 | 549 |
| 70 | 30 | 486 |
| 60 | 40 | 423 |
| 40 | 60 | 297 |
| 30 | 70 | 234 |

In some embodiments, the NBCA or 2OCA, has already been treated with an acid polymerization inhibitor and a free radical polymerization inhibitor prior to the NBCA and 2-OCA being mixed together. The acid polymerization inhibitor can be, for example, sulfur dioxide, $SO_2$, which is added to each of the monomers at a concentration of about 40 ppm. The free radical/anti-oxidant stabilizer present in the monomer composition can be, for example, butylated hydroxyanisole (BHA) at a concentration of about 250 ppm prior to mixing with the second monomer. The present invention provides the ability to mix extremely pure and highly stabilized monomers so as to create new formulations that can be exposed to E-beam radiation or gamma radiation at any desired level, and not be adversely affected. The discussion herein further comprises methods for sterilizing the cyanoacrylate compounds of the present invention using radiation, preferably e-beam or gamma radiation. Also the present invention further provides for a method to seal tissues or treat wound by applying the cyanoacrylate compositions of the present invention to said wounds.

DETAILED DESCRIPTION

The discussion herein discloses processes and formulations comprised of N-butyl-cyanoacrylate, 2-octyl-cyanoacrylate and a stabilizer, which have increased stability upon irradiation using E-beam or gamma radiation than those mixtures of cyanoacrylates outside of the specified ranges. The cyanoacrylate monomers used according to the present invention are preferably fractionally distilled two times resulting in highly purified N-butyl cyanoacrylate and the 2-octyl-cyanoacrylate monomers. The resultant cyanoacrylate composition has applications in the medical, dental and veterinary disciplines.

As used herein, the following terms have the following meanings:

The term "ppm" as used in this specification means parts per million by weight.

The term "cyanoacrylate ester compositions" or "cyanoacrylate compositions" refers to polymerizable formulations comprising a mixture of cyanoacrylate ester monomers comprised of N-butyl-cyanoacrylate and 2-octyl-cyanoacrylate.

Cyanoacrylate esters are known in the art and are described in, for example, U.S. Pat. Nos. 3,527,224; 3,591,676; 3,667,472; 3,995,641; 4,035,334; and 4,650,826.

The polymerizable cyanoacrylate ester compositions described herein rapidly polymerize in the presence of water vapor or tissue protein.

The term "polymerization inhibitor" refers to acid polymerization inhibitors and free radical inhibitors of cyanoacrylate esters including materials such as anionic or acid polymerization inhibitors including sulfur dioxide, glacial acetic acid, and the like and free radical polymerization inhibitors such as hydroquinone, 4-methoxyphenol and the like. Exemplary free radical inhibitor/anti-oxidant stabilizers include hydroquinone, hydroquinonemonomethylether, catechol, pyrogallol, benzoquinone, 2-hydroxybenzoquinone, p-methoxyphenol, 1-butyl catechol, butylated hydroxytoluene, t-butyl hydroquinone, butylated hydroxyanisole (BHA) methyl hydroquinone, catechol, tert-butyl hydroquinone, 4-tert-butoxyphenol, 4-ethoxyphenol, 3-methoxyphenol, 2-tert-butyl-4-methoxyphenol, and 2,2-methylene-bis-(4-methyl-6-tert-butylphenol). BHA is a preferred free radical inhibitor. Another preferred antioxidant is butyl hydroxy toluene (BHT, or 4-methyl-2,6-di-tert-butylphenol), which is also a well-known antioxidant for food.

Exemplary anionic (acid) stabilizers for cyanoacrylate adhesives include sulphur dioxide, sulphonic acids, sultones, sulphuric acid, sulphur trioxide, phosphorous acids, phosphoric acid, mercaptan, alkyl sulfoxide, alkyl sulfide, lactone, alkyl sulfate, alkyl sulfite, 3-sulfolene, alkyl sulfone, carboxylic acids such as acetic acid, picric acid, boron trifluoride, $BF_3$-ether complexes, citric acid, hydrofluoric acid, tin (IV) chloride, iron (III) chloride, and mixtures of two or more thereof. Sulphur dioxide is particularly well known as a satisfactory stabilizer for cyanoacrylate adhesives under normal conditions of storage and use. The initial concentrations of sulphur dioxide needed to stabilize the adhesive compositions of this invention are in the range of about 20-150 ppm. Preferred concentrations are in the range of about 40-120 ppm. At levels less than about 20 ppm the adhesives may solidify or thicken excessively during irradiation or there may be insufficient sulphur dioxide remaining to give a useful shelf life after irradiation. The composition after irradiation should preferably contain sulphuric acid in an amount equivalent to at least 16 ppm of $SO_2$. At levels higher than about 150 ppm the cure speed and general performance of the adhesive may be adversely impaired. Concentration levels for other anionic stabilizers which are strong acids such as sulphonic acids, sulphuric acid, $BF_3$ etc. are likely to be in the range of about 15 to 150 ppm, and for weaker acids such as carboxylic acids are likely to be in the range of about 25 to 500 ppm. Because of its compatibility with topical skin applications, the acid polymerization inhibitor is preferably sulfur dioxide which is preferably employed at from about 50 to 1000 ppm, more preferably from about 50 to 500 ppm and even more preferably about 200 to 500 ppm, based on the total weight of the composition. Other preferred acid polymerization inhibitors include glacial acetic acid and other organic acids (e.g., $C_2$ to $C_6$ organic acids). Mixtures of free radical polymerization inhibitors and acid polymerization inhibitors are often used.

The term "antimicrobial agent" refers to agents that destroy microbes (e.g., bacteria, fungi, viruses and microbial spores) thereby preventing their development and pathogenic action.

The term "a biocompatible polymer" refers to polymers, which complex to substances such as iodine, and are compatible with in vivo applications of cyanoacrylate ester compositions onto mammalian tissues including human tissues. Representative polymers include polyvinylpyrrolidone, copolymers comprising polyvinylpyrrolidone, which are optionally cross-linked, and the like. Suitable copolymers include copolymers of polyvinylpyrrolidone and vinyl acetate or other vinyl compounds which copolymers are optionally cross-linked with a polyisocyanate. The molecular weight of these polymers can have number average molecular weights ranging from about 10,000 to about 1,000,000 and preferably from 30,000 to 300,000 or otherwise as desired.

The term "biocompatible plasticizer" refers to any material that is soluble or dispersible in the cyanoacrylate composition that increases the flexibility of the resulting polymer film coating on the skin surface, and which, in the amounts employed, is compatible with the skin as measured by the lack of moderate to severe skin irritation. Suitable plasticizers are well known in the art and include those disclosed in U.S. Pat. Nos. 2,784,127 and 4,444,933. Specific plasticizers include, by way of example only, acetyl tri-n-butyl citrate (preferably about 20 weight percent or less), acetyl trihexyl citrate (preferably about 20 weight percent or less) butyl benzyl phthalate, dibutyl phthalate, dioctylphthalate, diethylene glycol dibenzoate (preferably about 20 weight percent or less) and the like. Other biocompatible plasticizers include low molecular weight acrylic copolymers. The particular biocompatible plasticizer employed is not critical and preferred plasticizers include dioctylphthalate and acetyl tri-n-butyl citrate.

A method for producing a composition involves firstly the manufacture of N-butyl cyanoacrylate and 2-octyl-cyanoacrylate monomers to a high and reproducible state of purity using the Knoevenagel reaction between the corresponding alkyl cyanoacetate and paraformaldehyde followed by pyrolysis and distillation to remove process contaminants. Into each of the monomers is generally added anionic stabilizers and free-radical stabilizers.

The NBCA and 2-OCA mixtures herein can be prepared by conventional techniques of mixing the appropriate components until substantially homogenous. Specifically, the requisite amounts of the polymerizable N-butyl-cyanoacrylate are combined with the polymerizable 2-octyl-cyanoacrylate monomer or reactive oligomer and the free radical/anti-oxidant stabilizer and the resulting composition is mixed until homogenous. If desired, gentle heating may be employed to facilitate formation of the liquid composition. In addition to the free radical/anti-oxidant stabilizer added to the NBCA/2-OCA, each monomer will generally already have about 250 ppm of the stabilizer.

Thus, the NBCA/2-OCA compositions herein are comprised of the following:
1. 90% NBCA, 10% 2-OCA and 630-880 ppm of the free radical inhibitor/anti-oxidant stabilizer;
2. 80% NBCA, 20% 2-OCA and 549-799 ppm of the free radical inhibitor/anti-oxidant stabilizer;
3. 70% NBCA, 30% 2-OCA and 486-736 ppm of the free radical inhibitor/anti-oxidant stabilizer;
4. 60% NBCA, 40% 2-OCA and 423-673 ppm of the free radical inhibitor/anti-oxidant stabilizer;
5. 40% NBCA, 60% 2-OCA and 297-547 ppm of the free radical inhibitor/anti-oxidant stabilizer; and
6. 30% NBCA, 70% 2-OCA and 234-584 ppm of the free radical inhibitor/anti-oxidant stabilizer.

Free radical inhibitor/anti-oxidant stabilizers include hydroquinone, hydroquinonemonomethylether, catechol, pyrogallol, benzoquinone, 2-hydroxybenzoquinone, p-methoxy phenol, 1-butyl catechol, butylated hydroxytoluene, and t-butyl hydroquinone, butylated hydroxyanisole (BHA) methyl hydroquinone, catechol, tert-butyl hydroquinone, 4-tert-butoxyphenol, 4-ethoxyphenol, 3-methoxyphenol, 2-tert-butyl-4-methoxyphenol, and 2,2-methylene-bis-(4-methyl-6-tert-butylphenol). BHA is the preferred free radical inhibitor. Another preferred antioxidant is butyl hydroxy toluene (BHT, or 4-methyl-2,6-di-tert-butylphenol), which is also a well-known antioxidant for food and therefore is non-toxic.

The adhesive formulations are packed into suitable bottles, tubes, vials etc. The filled bottles are then sealed in metal foil (e.g. aluminum foil) pouches and subjected to E-beam or gamma irradiation with a dose of 25 kGy under conventional conditions i.e. at room temperature. Following this treatment the adhesives and untreated controls are fully assayed and evaluated for bonding performance, viscosity, shelf life and especially for any chemical changes which may have occurred during the irradiation stage. Additionally, the cyanoacrylate composition can optionally comprise a formaldehyde scavenger compound such as those described by Leung, et al. The use of such scavengers has been suggested as enhancing internal in vivo applications of cyanoacrylates.

The specific viscosity of the cyanoacrylate NBCA and OCA monomeric mixtures can be configured depending on the intended application of the composition. For example, relatively low viscosities are often preferred where application is to be made to a large surface area (e.g., abdominal surfaces). This preference results from the fact that those forms are less viscous and, accordingly, will permit more facile large surface area application of a thin film. Contrarily, where application is to be made to a specific position on the skin (e.g., elbow surfaces, knee surfaces and the like), higher viscosity compositions, including those containing thixotropic materials, are preferred to prevent "running" of the compositions to unintended locations. Accordingly, NBCA and OCA mixtures have a viscosity of from about 2 to 50,000 centipoise at 20° C. Preferably the less viscous compositions have a viscosity of from about 2 to 1,500 centipoise at 20° C. More preferably, the cyanoacrylate ester employed in these compositions is almost entirely in monomeric form and the composition has a viscosity of from about 5 to about 500 centipoise at 20° C. A thickening agent is optionally employed to increase the viscosity of the composition, which thickening agent is any biocompatible material, which increases the viscosity of the composition. Suitable thickening agents include, by way of example, polymethyl methacrylate (PMMA) or other preformed polymers soluble or dispersible in the composition, a suspending agent such as filmed silica and the like with PMMA being preferred. Fumed silica is particularly useful in producing a gel for topical application having a viscosity of from about 1500 to 50,000 centipoise at 20° C. Suitable thickening agents for the compositions described herein also include a partial polymer of the alkyl cyanoacrylate as disclosed in U.S. Pat. Nos. 3,654, 239 and 4,038,345. Thickening agents are deemed to be biocompatible if they are soluble or dispersible in the composition and are compatible with the skin as measured by the lack of moderate to severe skin irritation. Conventional additives such as thickeners, dyes and thixotropic agents may be included in the compositions as required. However for medical or veterinary use care should typically be taken to ensure that additives do not introduce toxic contaminants, which survive or are produced by irradiation.

The polymerizable cyanoacrylate ester compositions may additionally contain one or more optional additives such as colorants, perfumes, modifying agents, etc. In practice, each of these optional additives should typically be both miscible and compatible with the cyanoacrylate composition and the resulting polymer. Compatible additives are those that do not prevent the use of the cyanoacrylates in the manner described herein. In general, colorants are added so that the polymer layer formed on the skin will contain a discrete and discernable color. Perfumes are added to provide a pleasant smell. The amount of each of these optional additives employed in the composition is an adequate amount to achieve the desired effect.

The cyanoacrylate compositions of the present invention may also contain an antimicrobially effective amount of a compatible antimicrobial agent.

In a preferred embodiment, the cyanoacrylate ester composition is placed in a packaging container, which is preferably airtight and moisture resistant such as a tube or ampule. The container can be made of any suitable material such as glass, polyalkylene based polymers such as polypropylene or polyethylene, polyolefins, fluorinated polyolefins, metal foils and the like. Once filled the container is sealed. The cyanoacrylate ester composition and the container is sterilized using radiation such as E-beam or gamma radiation. The packaging element is filled with cyanoacrylate ester composition of the present invention using a pump such as a peristaltic pump. The container is then placed into a second container such as a polyfoil package or bag and sealed. The package or bag containing the container of cyanoacrylate ester composition of the present invention is then exposed to radiation.

If E-beam radiation is used to sterilize the composition, a conventional generator of high-energy electrons can be used. The E-beam radiation is maintained at an initial fluence of at least 2 $\mu$Curie/cm$^2$, preferably at least 5 $\mu$Curie/cm$^2$, more preferably at least 8 $\mu$Curie/cm$^2$ and even more preferably 10 $\mu$Curie/cm$^2$. Preferably the E-beam radiation employed has an initial fluence of from about 2 to about 25 $\mu$Curie/cm$^2$.

The dose of E-beam radiation employed is one sufficient to substantially sterilize the container as well as the cyanoacrylate ester composition of the present invention. In a preferred embodiment, the E-beam dosage is preferably from about 5 to 50 kGray and more preferably from about 11 to about 20 kGray with the specific dosage being selected relative to the density of material being subjected to E-beam radiation as well as the amount of bioburden estimated to be present within the composition and container.

E-beam sterilization is preferably conducted at a temperature of between 15° C. to about 30° C. Preferably the exposure of the product is less than about 60 seconds.

Prior to packing the cyanoacrylate ester composition in the container additional steps can be taken to reduce the bioburden. The cyanoacrylate ester composition can be microfiltered through a 0.2 $\mu$m filter using a peristaltic pump. The container can also be sanitized by steam, heat or ethylene oxide.

The cyanoacrylate ester compositions of the present invention can also be readily and fully sterilized by gamma irradiation with a minimum dose of 25-35 kGy at room temperature.

While the present invention has been described with an emphasis upon preferred embodiments, it will be obvious to those of ordinary skill in the art that variations in the preferred cyanoacrylate compositions and methods may be used and that it is intended that the invention may be practiced otherwise than as specifically described herein. Accordingly, the present invention includes all modifications encompassed within the spirit and scope of the invention as defined by the claims that follow.

What is claimed is:

1. A sterile cyanoacrylate composition consisting essentially of N-butyl-cyanoacrylate (NBCA), 2-ocytyl-cyanoacrylate (2-OCA) and a free radical inhibitor/antioxidant stabilizer wherein a composition comprising 90% NBCA, and 10% 2-OCA has 630-880 ppm of the free radical inhibitor/anti-oxidant stabilizer; a composition having 80% NBCA and 20% 2-OCA has 549-799 ppm of the free radical inhibitor/anti-oxidant stabilizer; a composition having 70% NBCA and 30% 2-OCA has 486-736 ppm of the free radical inhibitor/anti-oxidant stabilizer; a composition comprising 60% NBCA and 40% 2-OCA has 423-673 ppm of the free radical inhibitor/anti-oxidant stabilizer; a composition comprising 40% NBCA and 60% 2-OCA has 297-547 ppm of the free radical inhibitor/anti-oxidant stabilizer; and a composition comprising 30% NBCA and 70% 2-OCA has 234-584 ppm of the free radical inhibitor/anti-oxidant stabilizer.

2. The cyanoacrylate composition of claim 1 wherein the composition has been irradiated.

3. The cyanoacrylate composition of claim 2 wherein the composition has been irradiated with either E-beam radiation or gamma radiation.

4. The cyanoacrylate composition of claim 1 wherein the free radical inhibitor/antioxidant stabilizer is selected from the group consisting of hydroquinone, hydroquinonemonomethylether, catechol, pyrogallol, benzoquinone, 2-hydroxybenzoquinone, p-methoxy phenol, 1-butyl catechol, butylated hydroxytoluene, t-butyl hydroquinone, butylated hydroxyanisole (BHA) methyl hydroquinone, 4-tert-butoxyphenol, 4-ethoxyphenol, 2-tert-butyl-4-methoxyphenol, and 2,2-methylene-bis-(4-methyl-6-tert-butylphenol).

5. The cyanoacrylate composition of claim 1 further comprising an anionic acid stabilizer.

6. The cyanoacrylate composition of claim 5 wherein the anionic acid stabilizer is selected from the group consisting of sulphur dioxide, sulphonic acids, sultones, lactones, sulphuric acid, sulphur trioxide, phosphorous acids, carboxylic acids, picric acid, boron trifluoride, $BF_3$-ether complexes, citric acid, acetic acid, 3-sulfolene, alkylsulfone, alkyl sulfoxide, mercaptan, alkyl sulfate, alkyl sulfide, hydrofluoric acid, tin (IV) chloride and iron (III) chloride.

7. The cyanoacrylate composition of claim 1 further comprising a plasticizer.

8. The cyanoacrylate composition of claim 7 wherein the plasticizer is selected from the group consisting of acetyl tri-n-butyl citrate, acetyl trihexyl citrate, butyl benzyl phthalate, dibutyl phthalate, n-butyryl tri-n-hexyl citrate, dioctylphthalate, diethylene glycol dibenzoate and acrylic copolymers.

9. The cyanoacrylate composition of claim 7 wherein the plasticizer is present at a concentration of 20% (W/W) or less.

10. The cyanoacrylate composition of claim 1 further comprising a thickening agent.

11. The cyanoacrylate composition of claim 1 further comprising an antimicrobial agent.

12. A cyanoacrylate composition consisting essentially of N-butyl-cyanoacrylate (NBCA), 2-ocytyl-cyanoacrylate (2-OCA) and a free radical inhibitor/antioxidant stabilizer wherein a composition comprising 90% NBCA, and 10% 2-OCA has 630-880 ppm of the free radical/anti-oxidant stabilizer; a composition having 80% NBCA and 20% 2-OCA has 549-799 ppm of the free radical/anti-oxidant stabilizer; a composition having 70% NBCA and 30% 2-OCA has 486-736 ppm of the free radical/anti-oxidant stabilizer; a composition comprising 60% NBCA and 40% 2-OCA has 423-673 ppm of the free radical/anti-oxidant stabilizer; a composition comprising 40% NBCA and 60% 2-OCA has 297-547 ppm of the free radical/anti-oxidant stabilizer; and a composition comprising 30% NBCA and 70% 2-OCA has 234-584 ppm of the free radical/anti-oxidant stabilizer, wherein the free radical/anti-oxidant stabilizer is at least one of butylated hydroxytoluene or butylated hydroxyanisole (BHA).

13. The cyanoacrylate composition of claim 12 wherein the composition has been irradiated.

14. The cyanoacrylate composition of claim 13 wherein the composition has been irradiated with either E-beam radiation or gamma radiation.

15. The cyanoacrylate composition of claim 12 further comprising an anionic acid stabilizer.

16. The cyanoacrylate composition of claim 15 wherein the anionic acid stabilizer is selected from the group consisting of sulphur dioxide, sulphonic acids, sultones, lactones, sulphuric acid, sulphur trioxide, phosphorous acids, carboxylic acids, picric acid, boron trifluoride, $BF_3$-ether complexes, citric acid, acetic acid, 3-sulfolene, alkylsulfone, alkyl sulfoxide, mercaptan, alkyl sulfate, alkyl sulfide, hydrofluoric acid, tin (IV) chloride and iron (III) chloride.

17. The cyanoacrylate composition of claim 14 further comprising a plasticizer.

18. The cyanoacrylate composition of claim 17 wherein the plasticizer is selected from the group consisting of acetyl tri-n-butyl citrate, acetyl trihexyl citrate, butyl benzyl phthalate, dibutyl phthalate, n-butyryl tri-n-hexyl citrate, dioctylphthalate, diethylene glycol dibenzoate and acrylic copolymers.

19. The cyanoacrylate composition of claim 17 wherein the plasticizer is present at a concentration of 20% (W/W) or less.

20. The cyanoacrylate composition of claim 12 further comprising a thickening agent.

21. The cyanoacrylate composition of claim 14 further comprising an antimicrobial agent.

* * * * *